United States Patent [19]

Christ et al.

[11] Patent Number: 5,476,593
[45] Date of Patent: Dec. 19, 1995

[54] METHOD FOR FLUSHING AN UNDESIRED PRECIPITATE FROM APPARATUS SURFACES

[75] Inventors: Charles S. Christ, Fairport; Albert R. Szembrot, Penfield, both of N.Y.

[73] Assignee: Eastman Kodak Company, Rochester, N.Y.

[21] Appl. No.: 352,261

[22] Filed: Dec. 8, 1994

[51] Int. Cl.$^6$ ................................................. C02F 1/62
[52] U.S. Cl. .................... 210/729; 210/912; 134/22.13; 134/22.17
[58] Field of Search ............................... 134/22.1, 22.13, 134/22.16, 22.17; 210/729, 912

[56] References Cited

U.S. PATENT DOCUMENTS 5,288,728  2/1994  Spears et al. ........................ 210/729

Primary Examiner—Neil McCarthy
Attorney, Agent, or Firm—John R. Everett

[57] ABSTRACT

A method of removing undesired precipitate from the surfaces of an apparatus; wherein the apparatus is used in a process for removing silver from silver bearing photoprocessing solutions and the process includes the step of mixing a mercapto-s-triazine, or a water soluble salt thereof, with a silver bearing photoprocessing solution, thereby causing formation of the undesired precipitate and a precipitate of silver mercapto-s-triazine, said method comprising flushing inner surfaces of the apparatus with an aqueous solution having a pH of at least 9.8 thereby solubilizing the undesired precipitate.

5 Claims, 1 Drawing Sheet

METHOD FOR FLUSHING AN UNDESIRED PRECIPITATE FROM APPARATUS SURFACES

FIELD OF THE INVENTION

The present invention relates to recovering silver from photographic solutions.

BACKGROUND OF THE INVENTION

The commercial processing of photographic materials produces seasoned (spent) solutions containing silver ions. Environmental regulations restrict the discharge of solutions containing silver to concentrations much less than the silver concentrations generally found in seasoned solutions. Thus the silver concentrations in seasoned solutions must be greatly reduced before discharge into the environment.

A much improved precipitation process for removal of silver from seasoned silver containing solutions is disclosed in U.S. Pat. No. 5,288,728. The process is carried out in an apparatus having a number of inner surfaces. A mercapto-s-triazine compound, or a soluble salt there of, is used to precipitate silver inside the apparatus. The process and the apparatus are effective in recovering silver from the spent photoprocessing solutions. However, we discovered that an undesired precipitate forms during the procedure on the inner surfaces of the apparatus. The precipitate tends to stick steadfastly to tubing, filters and other parts of the apparatus. Such a precipitate will build up on the inner surfaces of the apparatus changing the preferred flow characteristics of the process and increasing the pressure necessary to move solution and desired silver precipitate through the apparatus to the collection point. In some cases, clogging of tubing has completely shut-down an apparatus. If the situation goes unnoticed a catastrophic failure may result in the spillage of the mixture of silver bearing photoprocessing solution and TMT reagent resulting in loss of the silver contained in the mixture.

The terms effluent and effluent stream refers to silver bearing photoprocessing solution. The terms treated effluent or treated solution refers to a mixture of silver bearing photoprocessing solution and TMT reagent.

SUMMARY OF THE INVENTION

Figure 1:
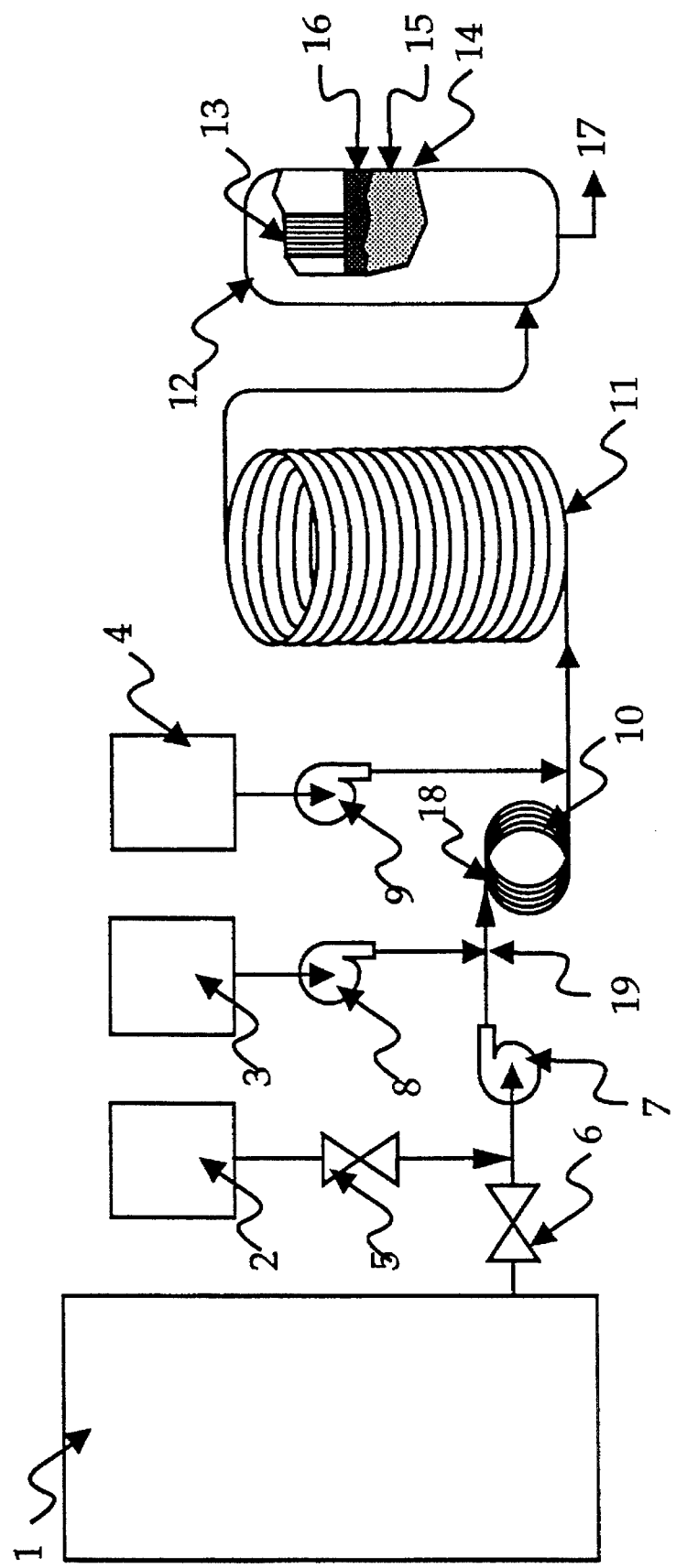
FIG. 1 presents an embodiment of apparatus in which unwanted precipitate builds up during silver a recovery process.

The formation of the undesired precipitate was completely unexpected. After substantial investigation we suspect, without limiting the present invention, that the undesired precipitate forms when photoprocessing solutions containing hexamethylenetetramine according to the following equation (1):

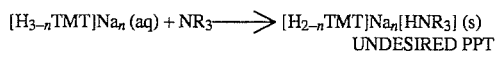

$$[H_{3-n}TMT]Na_n (aq) + NR_3 \longrightarrow [H_{2-n}TMT]Na_n[HNR_3] (s) \quad (1)$$
UNDESIRED PPT According to our research the undesired precipitate can be dissolved in a reasonable amount of time (minutes to hours) at a pH in excess of 9.8 according to equation (2):

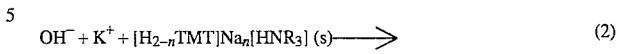

$$OH^- + K^+ + [H_{2-n}TMT]Na_n[HNR_3] (s) \longrightarrow \quad (2)$$
$$[H_{2-n}TMT]Na_nK (aq) + NR_3$$
UNDESIRED PPT In equations (1) and (2) n is 1 or 2, (aq) indicates the material is dissolved in water, (s) indicates a solid, and $NR_3$ is hexamethylenetetramine (HMTA).

It would be advantageous to remove the undesired precipitate from the inner surfaces of the silver recovery apparatus. Accordingly the present invention provides a method of removing undesired precipitate from the surfaces of an apparatus; wherein the apparatus is used in a process for removing silver from silver bearing photoprocessing solutions and the process includes the step of mixing a mercapto-s-triazine, or a water soluble salt thereof, with a silver bearing photoprocessing solution, thereby causing formation of the undesired precipitate and a precipitate of silver mercapto-s-triazine, said method comprising flushing inner surfaces of the apparatus with an aqueous solution having a pH of at least 9.8 thereby solubilizing the undesired precipitate.

DETAILED DESCRIPTION

This invention is applicable to any apparatus in which silver recovery is carried out using TMT to precipitate silver from photoprocessing solutions that include hexamethylenetetramine (HMTA). An example of a useful apparatus is presented below.

Silver-bearing solutions to be treated by the apparatus are accumulated in the collection tank 1. During the silver recovery process this solution is pumped from the collection tank 1 through the system by pump 7. The TMT reagent, stored in feed tank 3, is injected into the silver-bearing solution at point 19 by pump 8 to form a mixture of the silver bearing solution and the TMT reagent. At this point 19 the silver-TMT precipitate begins to form. The mixture then enters a small coil of tubing 10 to provide residence time for the chemical precipitation reaction between the silver and TMT reagent. This coil reactor 10 consists of approximately 5 feet of 0.5 inch internal diameter flexible tubing wrapped in a 5-inch diameter coil, which is oriented to direct flow in a vertical plane. After the mixture exits the small coil 10 and before it enters the large coil 11, a flocculating reagent is pumped by pump 9 from feed tank 4 into the mixture. A suitable flocculating agent for removal of silver is a cationic copolymer of acrylamide and acryloyloxyethyl trimethyl ammonium chloride available from the Calgon Corporation as Product No. POL-E-Z-2406. After the addition of the flocculant, the mixture flows into a larger reactor coil 11. This reactor coil 11 consists of approximately 40 feet of 0.5-inch internal diameter tubing oriented in a horizontal, upward spiral configuration. The large reactor coil 11 provides the mixing and residence time necessary to promote the agglomeration of the precipitate particles. As the mixture exits the top of the coil 11, a well-defined two-phase system exists: a silver-rich solid phase immersed in a relatively particle-free liquid phase. This two-phase mixture enters the filter 12 whereby the liquid is separated from the solid phase. A cut-away view 14 of the filter 12 is depicted in FIG. 1 to reveal the solids 15 which accumulate in the filter 12. The liquid phase 16 passes through the filter media 13 and is discharged from the filter 12 through conduit 17.

To provide a means to remove TMT-HMTA precipitate which can form and adhere to the inner surfaces of the apparatus, a cleanout system is added. This system consists of a cleaning solution feed tank 2 and a valve and conduit means 5 to dispense this solution into the silver recovery apparatus. During the cleanout procedure, valve 6 from the silver-bearing processing solution collection tank 1 is closed and the valve 5 is open to enable pump 7 to pump the cleanout solution through the entire apparatus.

As the above silver recovery process operates, build up of the undesired precipitate on the inner surfaces of the described apparatus is noticeable. Over time build up of the precipitate adversely affects the recovery process and the apparatus as mentioned hereinbefore. The surfaces of the apparatus are then flushed according to the present invention.

The pH of the flushing solution should be in excess of 9.8, preferably at least 11. More preferred is a pH between 11 and 12.5. The pH can be adjusted almost with any base such as alkali metal hydroxides, alkali metal carbonates, alkali metal phosphates, alkali metal borates. Buffer solutions of these materials may also be used. The higher the pH within these ranges, the greater the rate of solubilization of the undesired precipitate. Since the dissolution of the precipitate is an acid-base reaction, the concentration of the flushing solution necessary to remove the undesired precipitate is directly related to the total amount of undesired precipitate. Typical concentrations of a carbonate flushing solutions are between 0.1 and 1M. The concentration of the flushing solution required to remove the undesired precipitate is inversely proportional to the frequency at which the flushing procedure is performed. In other words, If the flushing procedure is performed often (every few days in a typical lab) a 0.1M solution of $Na_2CO_3$ is sufficient.

The following examples demonstrates that the method of the present invention removes the undesired precipitate from the inner surfaces of the previously described silver recovery apparatus.

EXAMPLE 1

In this example the silver recovery process is carried out in the previously described silver recovery apparatus using a 15% solution of TMT and a copolymer flocculating agent. During the continuous recovery operation the undesired precipitate formed on the inner surfaces of the coil in which TMT was mixed with the silver bearing photoprocessing solution, and the inner surfaces of the large coil where AgTMT precipitate agglomerates and on the surfaces of the filter and filter housing. Normal operation of the equipment was suspended. The undesired precipitate was clearly evident on the surfaces of the tubing.

A flushing system was added to the above apparatus as described in FIG. 1. The flushing system is comprised of a feed tank containing the flushing solution (25 g/L sodium carbonate) and a tube and valve means of introducing the flushing solution through the existing apparatus tubing and through the entire effluent treatment path. In other words, the flushing solution was made to contact all inner surfaces coming in contact with the mixture of photoprocessing and TMT solutions.

The flushing solution was pumped from the feed tank into the above silver recovery apparatus. The flushing solution displaced the mixture of photoprocessing solution and TMT solutions from the apparatus surfaces. In this example, 2 L of flushing solution was adequate to displace the total volume of the apparatus. The flushing solution was maintained in the apparatus overnight. The next day a visible reduction in the amount of the undesired precipitate in the apparatus was observed. Normal silver recovery operation of the apparatus was resumed. Any undesired precipitate that remained had been loosened by the action of the flushing solution and was flushed out of the system during the first several minutes of operation.

EXAMPLE 2

Samples of the undesired precipitate were removed from the silver recovery apparatus. Several small scale experiments were performed to determine the conditions necessary to dissolve the undesired precipitate.

A. A small portion (2–5 mg) of the undesired precipitate was placed in a test tube and about 3 ml of 0.5M $Na_2CO_3$ solution was added dropwise to the solid. The solid dissolved over a period of a few minutes.

B. A small portion (2–5 mg) of the undesired precipitate was placed in a test tube and a solution of about 0.2M $Na_3PO_4$ was added to the test tube. The addition of the basic phosphate solution was sufficient to dissolve the undesired precipitate.

C. A small portion (2–5 mg) of the undesired precipitate was placed in a test tube and a dilute solution of NaOH was added slowly to the solid. Only a very slow dissolution of the solid occurred below pH 10. A much more rapid dissolution of the solid was observed to occur at pH's above 11.

The results of these tests indicate that any cleaning solution should start at a pH in excess of 9.8, if a significant rate of dissolution of the undesired precipitate is sought.

The invention has been described in detail with particular reference to preferred embodiments thereof, but it will be understood that variations and modifications can be effected within the spirit and scope of the invention.

We claim:

1. A method of removing undesired precipitate from the surfaces of an apparatus; wherein the apparatus is used in a process for removing silver from silver bearing photoprocessing solutions and the process includes the step of mixing a mercapto-s-triazine, or a water soluble salt thereof, with a silver bearing photoprocessing solution, thereby causing formation of the undesired precipitate and a precipitate of silver mercapto-s-triazine, said method comprising flushing inner surfaces of the apparatus with an aqueous solution having a pH of at least 9.8 thereby solubilizing the undesired precipitate.

2. The method of claim 1 wherein the aqueous solution is maintained in contact with the apparatus inner surfaces up to 72 hours.

3. The method of claim 1 or 2 wherein the aqueous solution has a pH greater than 11.

4. The method of claim 3 wherein the aqueous solution has a pH of 11 to 12.5.

5. The method of claim 1 wherein the pH is adjusted and maintained with alkali metal carbonates and alkali metal phosphates and alkali metal borates.

\* \* \* \* \*